(12) United States Patent
Korkishko et al.

(10) Patent No.: US 7,444,561 B2
(45) Date of Patent: Oct. 28, 2008

(54) VERIFIER FOR REMOTELY VERIFYING INTEGRITY OF MEMORY AND METHOD THEREOF

(75) Inventors: Tymur Korkishko, Suwon-si (KR); Kyung-hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 11/330,093

(22) Filed: Jan. 12, 2006

(65) Prior Publication Data
US 2006/0190798 A1 Aug. 24, 2006

(30) Foreign Application Priority Data
Feb. 23, 2005 (KR) .................. 10-2005-0014888

(51) Int. Cl.
*G11C 31/28* (2006.01)
*G01R 31/28* (2006.01)
(52) U.S. Cl. .................. 714/718; 714/736; 714/819
(58) Field of Classification Search .............. 714/758, 714/718, 6, 807, 752, 746, 819, 736; 717/136, 717/106; 713/156; 726/9
See application file for complete search history.

(56) References Cited

U.S. PATENT DOCUMENTS

| | | | |
|---|---|---|---|
| 4,601,011 A * | 7/1986 | Grynberg | 713/184 |
| 6,480,970 B1 * | 11/2002 | DeKoning et al. | 714/6 |
| 2006/0190996 A1 * | 8/2006 | Korkishko et al. | 726/9 |
| 2007/0150857 A1 * | 6/2007 | Korkishko et al. | 717/106 |
| 2007/0168708 A1 * | 7/2007 | McCuller | 714/6 |

\* cited by examiner

*Primary Examiner*—Phung M Chung
(74) *Attorney, Agent, or Firm*—Sughrue Mion, PLLC

(57) ABSTRACT

A verifier for remotely checking integrity of a device connected via a network, includes a calculator which fills free areas in a memory of the device with random numbers and generates a local check code; an interface which transmits integrity check parameters that are used by the device to generate a remote check code, to the device, and receiving the remote check code from the device; a determiner which detects a remote check code generation time and compares the detected remote check code generation time with a presorted remote check code generation expectation time; and a controller which confirms the integrity of the memory of the device when the remote check code generation time does not exceed the remote check code generation expectation time according to a result of the determination and the local check code matches the remote check code.

26 Claims, 6 Drawing Sheets

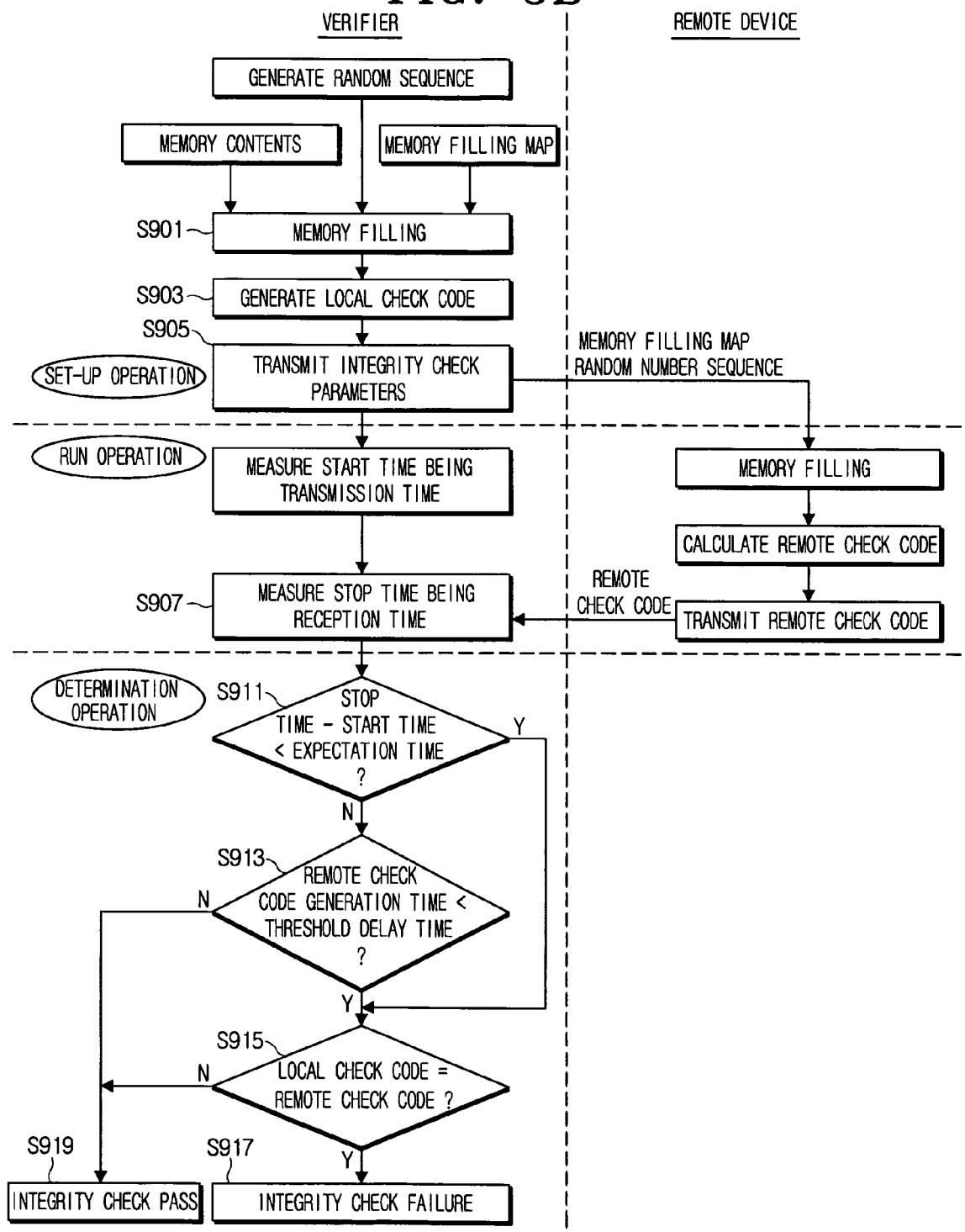

VERIFIER FOR REMOTELY VERIFYING INTEGRITY OF MEMORY AND METHOD THEREOF

CROSS-REFERENCE TO RELATED APPLICATIONS

This application claims priority from Korean Patent Application No. 2005-14888 filed on Feb. 23, 2005, in the Korean Intellectual Property Office, the entire disclosure of which is incorporated herein by reference.

BACKGROUND OF THE INVENTION

1. Field of the Invention

Verifiers, systems and methods consistent with the present invention relate to remotely verifying the integrity of a memory by checking whether a check code, which is generated by filling out free areas of the memory of a device with random numbers, and a check code, generated by the device, match and using a check code generation time from the device.

2. Description of the Related Art

FIG. 1 depicts an integrity verification method of a conventional device.

Referring now to FIG. 1, remote network appliances, such as television set-top boxes, mobile phones, personal computers based on local area networks (LANs) and wide area networks (WANs), and miniature sensors, are vulnerable to tampering by hackers because of the limited ability of a network host or a service provider to control user access to the remote devices. The network host or service provider cannot easily physically inspect the remote device, and it is difficult to determine whether a remote device has been tampered with, for example, by a user to obtain unauthorized access to software applications offered by the network. Thus, a technique is needed to verify the integrity of a memory of the remote device in a network environment. The integrity is the assurance that information, in terms of data and network security, can only be accessed or modified by authorized users.

Conventional memory integrity verification methods check the integrity of the remote device by comparing a digest value for a selected software and a hash value of a memory area of the remote device.

A conventional method using the hash value of the memory area to check the integrity is disclosed in U.S. Patent Application Publication No. 2002/0138554. The conventional method using the hash value of the memory area generates a hash value by inserting a random seed in the memory area, and provides the device with information regarding the random seed, the hash function, and the memory area to be verified. The device generates a hash value of the memory area to be verified by using the information provided from a verifier, and transmits the generated hash value to the verifier. Next, the verifier compares its generated hash value relating to the memory area and the hash value generated by the device to check the integrity of the memory area.

Such a conventional method verifies the integrity using the hash value of the memory area to be checked. However, in case a malicious code, such as a virus, attacks or tampers, with the memory location, the integrity check is bypassed. As a result, the verifier cannot accurately conduct the integrity verification.

A conventional device integrity verification method using a digest of a selected software is disclosed in U.S. Pat. No. 6,748,538. This conventional method signs a digest with respect to a software stored in the device and stores it in a memory. The integrity of the software is checked by comparing a digest which applies a separate hash function to the selected software and the signed digest. However, disadvantageously, this method can check the integrity only for the software stored in the memory.

U.S. Pat. No. 6,138,236 discloses a method to confirm the integrity of software by checking the signature of the software when a code stored in a programmable read only memory (PROM) boots up. However, this conventional method can internally confirm the integrity only during the boot-up. In other words, a separate secure mechanism is required to confirm the integrity of the software from an outside. Additionally, if an attacker alters the PROM contents and generates the valid check code, an accurate integrity check is infeasible.

Thus, a new method is needed to verify the integrity of a memory from the outside during the run time, as well as the boot-up, and is invulnerable against attacks by a malicious code to alter the memory location.

SUMMARY OF THE INVENTION

An aspect of an exemplary embodiment of the present invention provides a verifier, a system, and, a method for remotely verifying the integrity of a memory by checking whether a check code, which is generated by filling out free areas of the memory device with random numbers, and a check code, generated by the device, match and using a check code generation time from the device.

A verifier for remotely checking the integrity of a memory of a device connected via a network, includes a calculator which fills out free areas in a memory of the device with random numbers based on a prestored memory filling map and generates a local check code which is a message authentication code (MAC) for the integrity check of the memory; an interface which transmits integrity check parameters that are used by the device to generate a remote check code which is an MAC for the integrity check of the memory, to the device, and received the remote check code from the device; a determiner which detects a remote check code generation time by measuring a transmission time of the integrity check parameters and a reception time of the remote check code and compares the detected remote check code generation time with a prestored remote check code generation expectation time; and a controller which confirms the integrity of the memory of the device when the remote check code generation time does not exceed the remote check code generation expectation time according to a result of the comparison and the local check code matches the remote check code.

The verifier may further include a storage which stores contents of the memory of the device, the random numbers, the memory filling map, and the remote check code generation expectation time.

The verifier may further include a random number generator which generates the random numbers to fill out the free areas in the memory by use of a random function.

The calculator may generate the local check code by reading out the contents in the memory in a reverse order and applying an MAC generation function.

The controller may determine the integrity check failure of the memory of the device when the remote check code generation time exceeds the remote check code generation expectation time according to a result of the comparison.

The remote check code generation expectation time may be an average time taken to generate the remote check code when the integrity of the memory of the device is verified.

The controller may check the integrity of the memory by comparing the local check code and the remote check code when the determiner determines that the remote check code generation time exceeds the remote check code generation expectation time but does not exceed a prestored threshold delay time.

The device may include an interface which receives the integrity check parameters and transmits the generated remote check code to the verifier; a central processing unit (CPU) which stores an MAC generation function used to generate the local check code; and a generator which generates the remote check code using the received integrity check parameters and the MAC generation function.

The integrity check parameters may include the random numbers and the memory filling map which is used to fill out the free areas in the memory with the random numbers.

The generator may generate the remote check code by filling out the free areas in the memory with the random numbers based on the memory filling map and applying the MAC generation function while reading out the contents in the memory in a reverse order.

A system including a device and a verifier which is communicatively connected to the device via a network and remotely verifies an integrity of a memory, includes the verifier which fills out free areas in the memory with random numbers, generates a local check code which is an MAC to check the integrity of the memory, and checks the integrity of the memory by determining whether the local check code matches a remote check code which is an MAC generated at the device for the integrity check of the memory, and a remote check code generation time; and the device which generates the remote check code by receiving and using information used to generate the local check code.

The verifier may include a calculator which fills out the free areas in the memory with the random numbers based on a prestored memory filling map and generating the local check code which is the MAC for the integrity check of the memory; an interface which transmits integrity check parameters that are used for the device to, generate the remote check code which is the MAC for the integrity check of the memory, to the device, and receives the remote check code from the device; a determiner which detects the remote check code generation time by measuring a transmission time of the integrity check parameters and a reception time of the remote check code and compares the detected remote check code generation time with a prestored remote check code generation expectation time; and a controller which confirms the integrity of the memory when the remote check code generation time does not exceed the remote check code generation expectation time according to a result of the comparison and the local check code matches the remote check code.

The device may include an interface which receives the information used to generate the local check code and transmits the generated remote check code to the verifier; a CPU which stores an MAC generation function used to generate the local check code; and a generator which generates the remote check code using the received information used to generate the local check code and the MAC generation function.

A method for remotely verifying an integrity of a memory of a device that is connected via a network using a verifier, comprises filling out free areas in a memory of the device with random numbers based on a prestored memory filling map and generating a local check code which is an MAC for the integrity check of the memory; transmitting integrity check parameters that are used for the device to generate a remote check code which is an MAC for the integrity check of the memory, to the device, and receiving the remote check code from the device; detecting a remote check code generation time by measuring a transmission time of the integrity check parameters and a reception time of the remote check code and comparing the detected remote check code generation time with a prestored remote check code generation expectation time; and confirming the integrity of the memory of the device when the remote check code generation time does not exceed the remote check code generation expectation time according to a result of the comparison and the local check code matches the remote check code.

The method may further include storing contents of the memory of the device, the random numbers, the memory filling map, and the remote check code generation expectation time.

The method may further include generating the random numbers to fill out the free areas in the memory by use of a random function.

The local check code may be generated by reading out the contents in the memory in a reverse order and applying an MAC generation function.

The integrity confirmation may determine the integrity check failure of the memory of the device when the remote check code generation time exceeds the remote check code generation expectation time according to a result of the comparison.

The remote check code generation expectation time may be an average time taken to generate the remote check code when the integrity of the memory of the device is verified.

The integrity of the memory may be checked by comparing the local check code and the remote check code when a comparison is made that remote check code generation time exceeds the remote check code generation expectation time but does not exceed a prestored threshold delay time.

The integrity check parameters may include the random numbers and the memory filling map which is used to fill out the free areas in the memory with the random numbers.

A method for remotely verifying an integrity of a memory by use of a system including a device and a verifier which is communicatively connected to the device via a network and remotely checks the integrity of a memory, include filling out, by the verifier, free areas in a memory of the device with random numbers based on a prestored memory filling map and generating a local check code which is an MAC for the integrity check of the memory; transmitting, by the verifier, integrity check parameters used for the device to generate a remote check code which is an MAC for the integrity check of the memory, to the device and measuring a transmission time of the integrity check parameters; generating, by the device, the remote check code using the received integrity check parameters and transmitting the generated remote check code to the verifier; detecting, by the verifier, a remote check code generation time by receiving the remote check code and measuring a reception time of the remote check code, and comparing the remote check generation time with a prestored remote check code generation expectation time; and confirming by the verifier, the integrity of the memory of the device when the remote check code generation time does not exceed the remote check code generation expectation time according to a result of the comparison and the local check code matches the remote check code.

BRIEF DESCRIPTION OF THE DRAWING FIGURES

The above and other aspects of the invention will become apparent and more readily appreciated from the following description of exemplary embodiments, taken in conjunction with the accompanying drawing figures of which:

FIGS. 5A and 5B are flowcharts for explaining a method for remotely verifying the integrity of the memory according to an exemplary embodiment of the present invention.

DETAILED DESCRIPTION OF THE EXEMPLARY EMBODIMENTS

Figure 1:
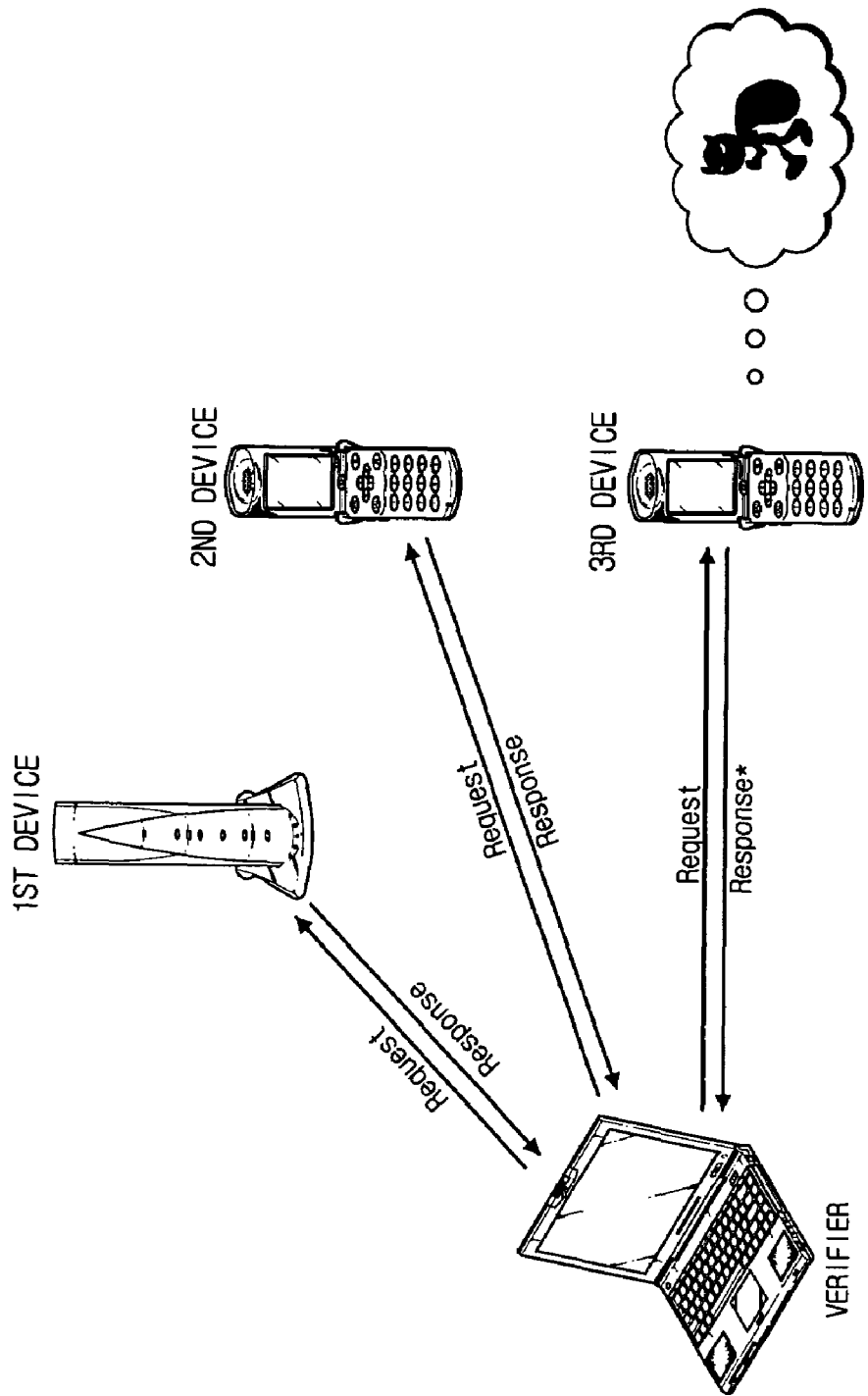
FIG. 1 is a conventional integrity check method of a device.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 2:
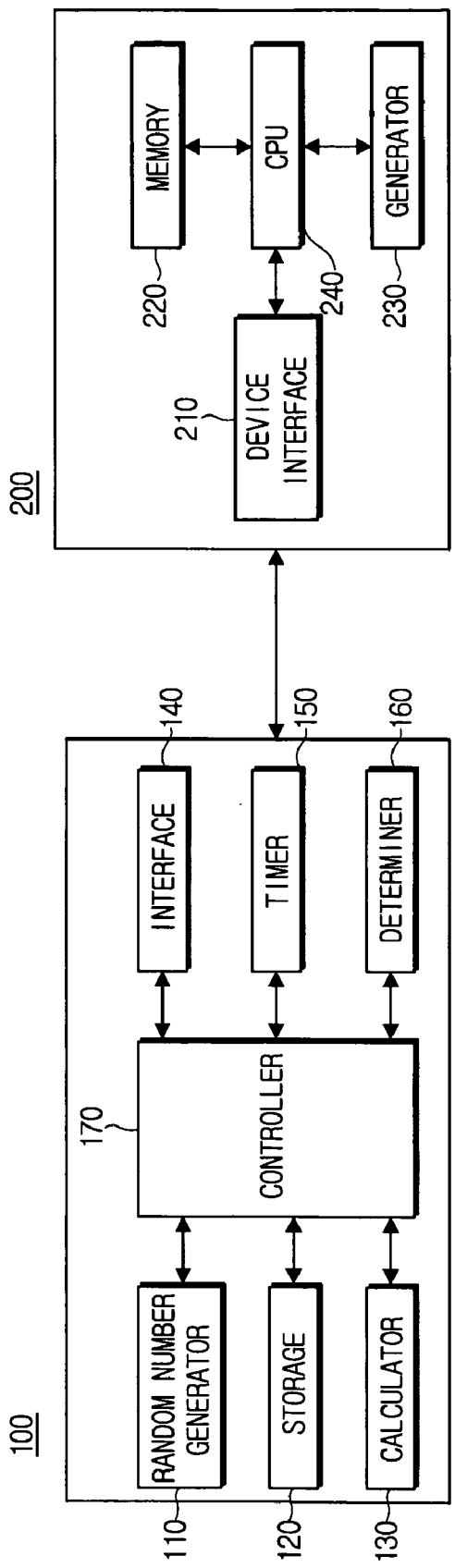
FIG. 2 is a block diagram of a system for remotely verifying the integrity of a memory according to an exemplary embodiment of the present invention.

FIG. 2 is a block diagram of a system for remotely verifying the integrity of the memory 220 according to an exemplary embodiment of the present invention.

Referring to FIG. 2, the system includes a verifier 100 and a device 200.

The verifier 100 includes a random number generator 110, storage 120, a calculator 130, an interface 140, a timer 150, a determiner 160, and a controller 170.

The random number generator 110 generates random numbers to fill out free areas of the memory 220 of the device 200 using a prestored random function.

The storage 120 stores the random function used by the random number generator 110, memory contents of the device 200 to be verified for the integrity, a memory filling map which is information relating to how to fill out the free areas of the memory device with the random number, an MAC generation function used to generate a local check code which is an MAC for the integrity check of the device 200, a generation expectation time of a remote check code generated by the device 200, and a threshold delay time which is a time delay during the generation of the remote check code when the integrity of the memory 220 is verified.

The storage 120 also stores the memory contents of the device 200 to be verified for integrity by the verifier 100. The memory filling map may indicate various schemes to fill up the free areas of the memory 220 with the random numbers, such as a scheme to fill out the free areas in sequence and a scheme to fill out the free areas at random. The remote check code generation expectation time at the device 200 determines a time taken to generate the remote check code when the integrity is confirmed due to the absence of malicious codes in the memory 220.

The calculator 130 fills out the free areas of the memory 220 with the random number according to the memory filling map and generates the local check code which is used to verify the integrity of the memory 220 using the MAC generation function stored in the storage 120 while reading the contents in the fully occupied memory 220 in the reverse order. The MAC is appended to data to verify whether the data is tampered with or corrupted due to modification, deletion, insertion of data, and so on. The MAC generation function may be a hash function.

The interface 140 is used to transmit and receive data to and from the device 200. Specifically, the interface 140 receives the remote check code from the device 200 or transmits to the device 200 integrity check parameters which are used to generate the remote check code. The integrity check parameters are the random numbers generated by the random number generator 110 and the memory filling map stored in the storage 120.

The timer 150 measures a transmission time taken to send the integrity check parameters, which are used to generate the remote check code, to the device 200, and a reception time taken for the verifier 100 to receive the generated remote check code from the device 200. The remote check code generation time can be obtained by calculating a difference between the reception time and the transmission time. The integrity of the memory 220 can be checked based on whether the device 200 generates the remote check code within the generation expectation time of the remote check code.

The determiner 160 can confirm the integrity of the memory 220 by comparing the remote check code generation time measured by the timer 150 and the remote check code generation expectation time stored in the storage 120. When the measured remote check code generation time does not exceed the stored remote check code generation expectation time, the determiner 160 then compares the remote check code and the local check code to determine whether the remote check code and the local check code match so as to check the integrity of the memory 220.

By contrast, when the measured remote check code generation time exceeds the stored remote check code generation expectation time, the determiner 160 compares the measured remote check code generation time and the threshold delay time which is a probable delay time during remote check code generation. When the measured remote check code generation time exceeds the threshold delay time, the integrity of the memory is not confirmed. The integrity of the memory is not confirmed because the presence of malicious codes, such as viruses or malwares, increase the remote check code generation time using the MAC generation function.

The controller 170 controls the components of the verifier 100. For example, when contents stored in a storage 120 are selected to check the integrity of the memory 220, the controller 170 controls the interface 140 to transfer the memory filling map and the random numbers that are used to generate the local check code, to the device having the selected memory contents. When the interface 140 transfers the memory filling map and the random number sequence, which are the integrity check parameters, to the device 200, the controller 170 controls the timer 150 to measure the time when the remote check code is received from the device 200.

In addition, when the determiner 160 determines that the remote check code generated by the device 200 is received within the remote check code generation expectation time and the threshold delay time, the controller 170 determines whether the local check code generated by the calculator 130 and the received remote check code match. When the local check code and the remote check code match according to a result of the determination, the integrity of the memory 220 is confirmed. Otherwise, when the two codes do not match, the integrity of the memory 220 is not confirmed.

The device 200 includes a device interface 210, the memory 220, a generator 230, and a CPU 240.

The device interface 210 is responsible for transmitting and receiving data to and from the verifier 100. Specifically, the device interface 210 transmits the remote check code generated by the generator 230 to the interface 140 of the verifier 100, and receives from the interface 140 the integrity check parameters used to generate the remote check code.

The memory 220 stores a software commonly stored in the verifier 100, a software provided from a network host to the device 200, a software known to the verifier 100, and the like. The memory 220 has free areas without data in the memory area.

The generator 230 generates the remote check code using the memory filling map and the random numbers which are received from the verifier 100. That is, similar to the operation of the calculator 130 of the verifier 100, the generator 230 fills out the free areas in the memory 220 with the random numbers according to the memory filling map. The generator 230 generates the remote check code using the contents in the memory 220 having no free area and the MAC generation function which is used to generate the local check code.

The CPU 240 controls overall operations of the components of the device 200. In addition, the CPU 240 stores the MAC generation function used to generate the remote check code by the generator 230.

Figure 3A:
FIGS. 3A through 3D depict operations to generate a local check code in the system for remotely verifying the integrity of the memory according to an exemplary embodiment of the present invention.
Figure 3B:
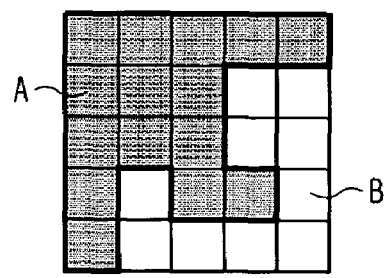
Figure 3C:
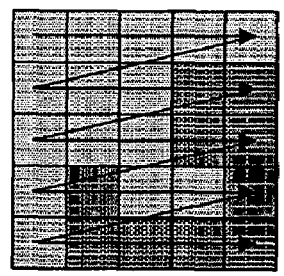
Figure 3D:
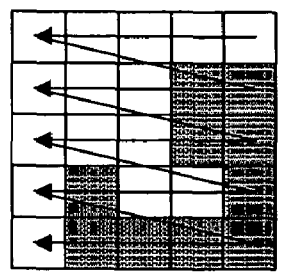

FIG. 3A through FIG. 3D are diagrams illustrating operations to generate the local check code in the system for remotely checking the integrity of the memory 220 according to an exemplary embodiment of the present invention. In further detail, FIG. 3A depicts the random numbers generated by the random number generator 110, and FIG. 3B depicts contents in the memory 220 to be checked for its integrity. FIG. 3C depicts free areas of the memory 220 which is full of the random numbers, and FIG. 3D depicts how the calculator 130 generates the local check code.

Referring first to FIG. 3A, the random number generator 110 generates the random numbers, which in this example form a random number sequence, using the random function.

In FIG. 3B, the region A indicates areas where content such as software are stored, and the region B indicates the free areas of the memory 220 of the device 200 to be checked for the integrity.

As shown in FIG. 3C, the free areas in the memory 220 are filled with the random numbers, as shown in FIG. 3A, using the memory filling map of the integrity check parameters provided from the verifier 110. FIG. 3C shows that the free areas in the memory 220 are filled up according to the memory filling map which directs inserting of the random numbers into the free areas in sequence.

Referring to FIG. 3D, the local check code is generated according to the MAC, such as hash functions, while reading out the data from the memory 220 filled with the random number sequence in the free areas in the reverse order. At this time, to generate the local check code after the device 200 is completely filled up with the random numbers, the data stored in the memory 220 is read out in the reverse order and the local check code is generated. Hence, the security can be enhanced.

Figure 4A:
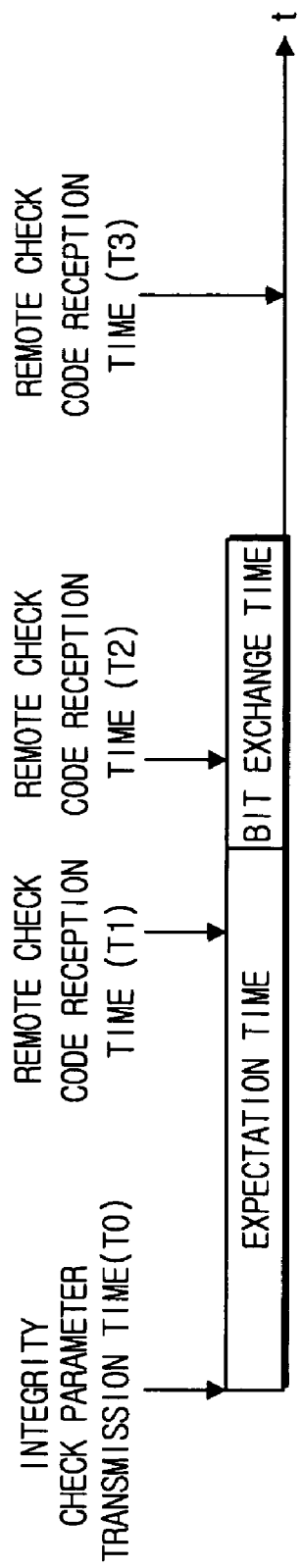
FIGS. 4A and 4B illustrate an operation of a determiner of FIG. 2.
Figure 4B:
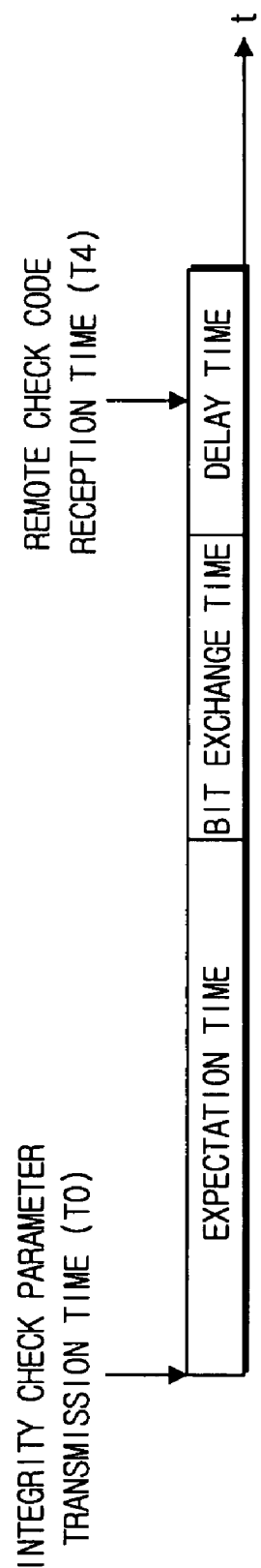

FIGS. 4A and 4B illustrate the operation of the determiner 160 in FIG. 2. In more detail, FIG. 4A depicts a case when the remote check code is transmitted to the verifier 100 from the device 200 without delay, and FIG. 4B depicts a case when the remote check code is transmitted to the verifier 100 from the device 200 with delay.

T0 is a time when the integrity check parameters are transmitted to the device 200 from the verifier 100, and T1 is a time when the remote check code is transmitted to the verifier 100 from the device 200 within the remote check code generation expectation time. T2 is a time when the remote check code is received at the verifier 100 within one bit exchange time after the expectation time, T3 is a time when the remote check code is received at the verifier 100 after the one bit exchange time, and T4 is a time when the remote check code is received at the verifier 100 within the delay time.

Referring to FIG. 4A, the determiner 160 of the verifier 100 determines the pass of the integrity check of the memory 220 when the remote check code generated at the device 200 is received at the time T1 within the expectation time and the remote check code matches the local check code. That is, the determiner 160 confirms that the device is free from viruses and malwares.

When the remote check code is not received at the time T1 within the expectation time, but is received at the time T2 within the one bit exchange time after the expectation time, the determiner 160 also determines the pass of the integrity check of the memory 220. By contrast, when the remote check code is received after the one bit exchange time and after the expectation time, the determiner 160 determines a failure of the integrity check of the memory 220. There is a failure of the integrity check because the remote check code generation time in the presence of malicious codes or errors in the device 200 is longer than the remote check code generation time in the absence of malicious codes or errors in the device 200.

Referring to FIG. 4B, when the remote check code is received at a certain delay time, which is the delay threshold, after the one bit exchange time and after the expectation time, the determiner 160 determines the pass of the integrity check of the memory 220. When the remote check code is received within the delay time, it is possible to check the integrity of the memory 220.

Figure 5A:
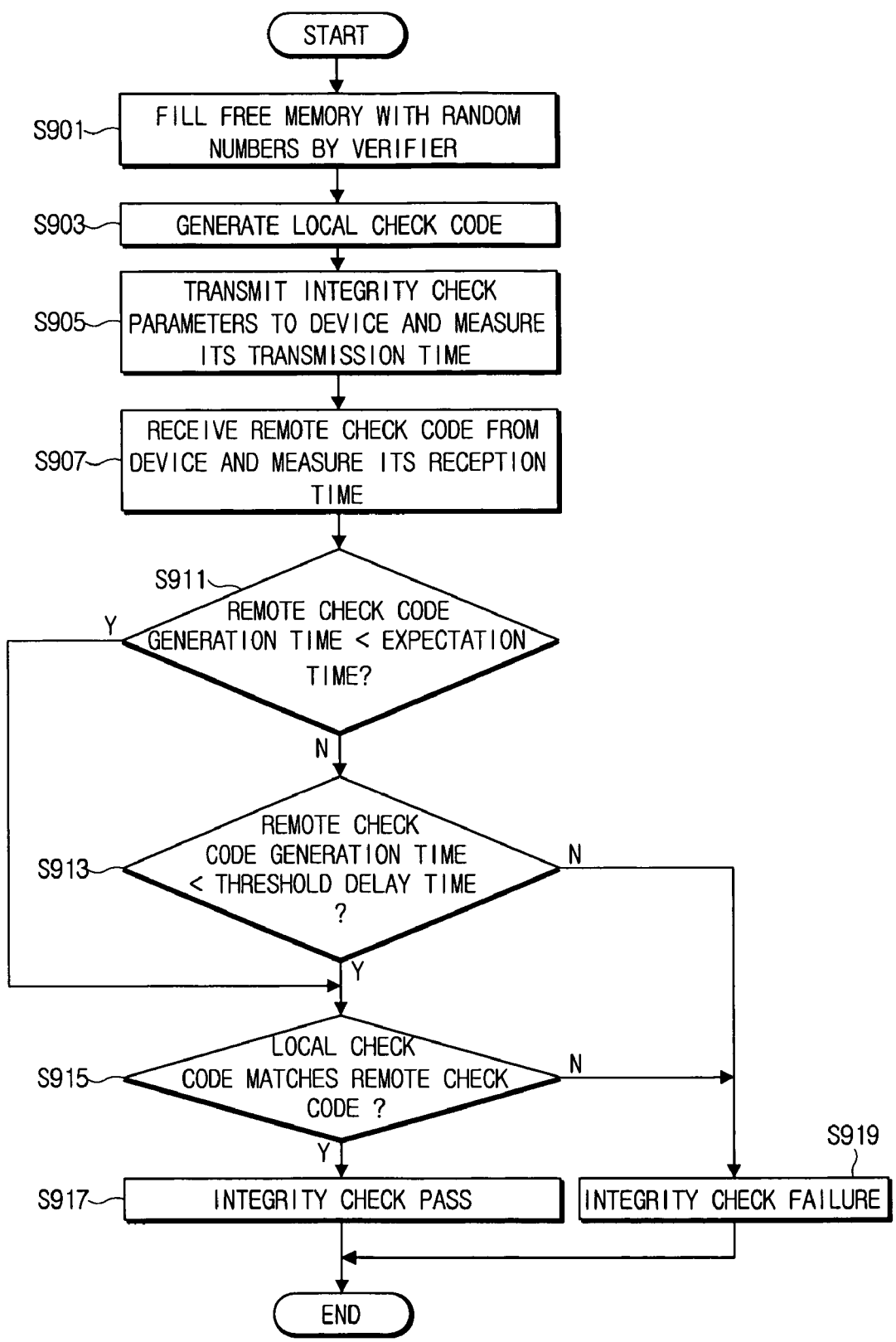

FIG. 5A and FIG. 5B are flowcharts explaining a method for remotely verifying the integrity of the memory 220 according to an exemplary embodiment of the present invention. In further detail, FIG. 5A explains the method for remotely verifying the integrity of the memory 220 according to an exemplary embodiment of the present invention, and FIG. 5B explains the detailed operation of the integrity check at the verifier 100 and the device 200.

Referring to FIG. 5A and FIG. 5B, the verifier 100, which is connected to the device 200 to be checked for its integrity via a network, fills out the free areas in the memory 220 with the random numbers (S901). The contents in the memory 220 to be checked for integrity are prestored in the verifier 100. The free areas in the memory 220 are filled up with the random numbers according to the prestored memory filling map. The memory filling map contains information for filling the free areas in the memory 220, and the random numbers can be generated using the random function.

Next, the local check code, which is MAC generated at the verifier 100, is generated using the memory contents filled up with the random numbers and the prestored MAC generation function (S903). The local check code is produced by applying the MAC generation function to the memory contents in the reverse order. The MAC generation function may be a hash function.

The integrity check parameters are transmitted to the device 200, and its transmission time is measured (S905). The integrity check parameters are the memory filling map and the random numbers which fill the free areas in the memory 220. The integrity check parameters are used to generate the remote check code which is MAC generated at the device 200. The information used to generate the local check code is applied after the generation of the remote check code, and the integrity of the memory 220 can be verified depending on whether the generated local check code and the remote check code match.

The integrity check of the device 200 requires that the local check code and the remote check code match, and that the remote check code be generated within a certain time. Thus, to detect the remote check code generation time, the transmission time of the integrity check parameters is measured.

The remote check code is received from the device and its reception time is measured (S907). The device 200 generates the remote check code using the random numbers and the memory filling map, which are the integrity check parameters received from the verifier 100, and the prestored MAC generation function, and sends the generated remote check code to the verifier 100. Note that the generation operation of the remote check code at the device 200 is similar to the generation operation of the local check code at the verifier 100.

Specifically, after the free areas in the memory 220 are filled out with the random numbers according to the memory filling map, the remote check code is generated by applying the MAC generation function, which matches the MAC generation function used to generate the local check code, to the memory contents. The generated remote check code is transmitted to the verifier 100, and its reception time is measured.

By measuring the transmission time of the integrity check parameters and the reception time of the remote check code, which is generated using the integrity check parameters, at the verifier 100, the time when the remote check code is generated at the device 200 can be obtained. That is, the remote check code generation time can be detected by calculating the difference between the reception time of the remote check code and the transmission time of the integrity check parameters.

Next, the remote check code generation time is compared with the prestored remote check code generation expectation time (S911).

When the remote check code generation time exceeds the remote check code generation expectation time, the delayed remote check code generation time is compared with the threshold delay time (S913). The delayed remote check code generation time is compared with the threshold delay time in order to determine whether the remote check code generation time is delayed to the extent that integrity of the memory 220 can be verified, even when the remote check code generation time exceeds the remote check code generation expectation time. At this time, the threshold delay time is predefined.

When the remote check code generation time exceeds the remote check code generation expectation time, but the delayed remote check code generation time does not exceed the threshold delay time, a determination is made on whether the local check code and the remote check code match (S915). Also, when the remote check code generation time does not exceed the remote check code generation expectation time in operation S911, the determination is made on whether the local check code and the remote check code match (S915).

Next, when the local check code generated at the verifier 100 matches the remote check code generated at the device 200, the integrity check pass of the memory 220 is determined (S917). Specifically, when the local check code matches the remote check code which is generated using the local check code, the random numbers used for the local check code, the memory filling map, the same MAC generation function, and the remote check code is generated within the expectation time to verify the integrity of the memory 220, a determination can be made that malicious codes are not present in the memory 220 of the device 200.

By contrast, when the delayed remote check code generation time exceeds the threshold delay time in operation S913, or when the delayed remote check code generation time does not exceed the threshold delay time in operation S913, but the local check code and the remote check code do not match in operation S915, the integrity check failure of the memory 220 is determined (S919).

When the remote check code generation time is delayed to the extent that the integrity of the memory 220 cannot be confirmed, the integrity check failure of the memory 220 is determined without having to compare the local check code and the remote check code. If the delayed remote check code generation time does not exceed the threshold delay time, even when the remote check code is generated using the same random numbers memory filling map, and an MAC used for the local check code generation, the local check code and the remote check code could possibly not match. As a result, the presence of the malicious codes in the memory 220 of the device 200 can be determined.

As set forth above, the free areas in the memory are filled out with the random numbers and then the MAC is generated. Therefore, the integrity can be accurately verified even when malicious codes, such as viruses, alter or tamper with data.

The integrity of the memory is checked using the MAC generation time of the device, rather than the specific information of the device. Thus, an independent hardware is not required to check the integrity.

Furthermore, the integrity of the memory can be remotely verified not only during the boot-up, but also during run-time of the device.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A verifier which remotely checks an integrity of a device connected via a network, the verifier comprising:
    a calculator which fills free areas in a memory of the device with random numbers based on a prestored memory filling map and generates a local check code used to check the integrity of the memory;
    an interface which transmits integrity check parameters which are used by the device to generate a remote check code used to check the integrity the memory, to the device, and receives the remote check code from the device;
    a determiner which detects a remote check code generation time by measuring a difference between a transmission time of the integrity check parameters and a reception time of the remote check code and compares the detected remote check code generation time with a prestored remote check code generation expectation time; and
    a controller which confirms the integrity of the memory of the device if the remote check code generation time does not exceed the remote check code generation expectation time according to a result of the comparison by the determiner and the local check code matches the remote check code.

2. The verifier according to claim 1, wherein the local check code and the remote check code are generated using a message authentication code (MAC).

3. The verifier of claim 2, wherein the calculator generates the local check code by reading out the contents in the memory in a reverse order and applying an MAC generation function.

4. The verifier of claim 2, wherein the device comprises:
an interface which receives the integrity check parameters and transmits the generated remote check code to the verifier;
a central processing unit (CPU) which stores an MAC generation function used to generate the local check code; and
a generator which generates the remote check code using the received integrity check parameters and the MAC generation function.

5. The verifier of claim 4, wherein the integrity check parameters comprise the random numbers and the memory filling map which is used to fill out the free areas in the memory with the random numbers.

6. The verifier of claim 5, wherein the generator generates the remote check code by filling the free areas in the memory with the random numbers based on the memory filling map and applying the MAC generation function while reading out the contents in the memory in a reverse order.

7. The verifier of claim 1, further comprising:
a storage which stores contents of the memory of the device, the random numbers, the memory filling map, and the remote check code generation expectation time.

8. The verifier of claim 1, further comprising:
a random number generator which generates the random numbers to fill out the free areas in the memory by use of a random function.

9. The verifier of claim 1, wherein the controller determines an integrity check failure of the memory of the device if the remote check code generation time exceeds the remote check code generation expectation time according to a result of the comparison.

10. The verifier of claim 1, wherein the remote check code generation expectation time is an average time taken to generate the remote check code if the integrity of the memory of the device is verified.

11. The verifier of claim 1, wherein the controller checks the integrity of the memory by comparing the local check code and the remote check code if the determiner determines that remote check code generation time exceeds the remote check code generation expectation time but does not exceed a presorted threshold delay time.

12. A system comprising:
a device; and
a verifier which is communicatively connected to the device via a network and remotely verifies an integrity of a memory,
wherein the verifier fills out free areas in the memory with random numbers, generates a local check code to check the integrity of the memory, and checks the integrity of the memory by determining whether the local check code matches a remote check code for the integrity check of the memory, and that a remote check code generation time does not exceed a remote check code generation expectation time, and
wherein the device generates the remote check code by receiving and using information used to generate the local check code.

13. The system of claim 12, wherein the verifier comprises:
a calculator which fills the free areas in the memory with the random numbers based on a presorted memory filling map and generates the local check code for the integrity check of the memory;
an interface which transmits integrity check parameters that are used by the device to generate the remote check code for the integrity check of the memory, to the device, and receives the remote check code from the device;
a determiner which detects the remote check code generation time by measuring a transmission time of the integrity check parameters and a reception time of the remote check code and compares the detected remote check code generation time with a presorted remote check code generation expectation time; and
a controller which confirms the integrity of the memory if the remote check code generation time does not exceed the remote check code generation expectation time according to a result of the comparison by the determiner and the local check code matches the remote check code.

14. The system of claim 12, wherein the device comprises:
an interface which receives the information used to generate the local check code and transmits the generated remote check code to the verifier;
a CPU which stores an MAC generation function used to generate the local check code; and
a generator which generates the remote check code using the received information used to generate the local check code and the MAC generation function.

15. The system according to claim 12, wherein the local check code and the remote check code are generated using a message authentication code (MAC).

16. A method which remotely verifies an integrity of a device that is connected via network using a verifier, the method comprising:
filling free areas in a memory of the device with random numbers based on a prestored memory filling map and generating a local check code for the integrity check of the memory;
transmitting integrity check parameters that are used by the device to generate a remote check code for the integrity check of the memory, to the device, and receiving the remote check code from the device;
detecting a remote check code generation time by measuring a transmission time of the integrity check parameters and a reception time of the remote check code and comparing the detected remote check code generation time with a presorted remote check code generation expectation time; and
confirming the integrity of the memory of the device if the remote check code generation time does not exceed the remote check code generation expectation time according to a result of the comparison and the local check code matches the remote check code.

17. The method according to claim 16, wherein the local check code and the remote check code are generated using a message authentication code (MAC).

18. The method of claim 17, wherein the local check code is generated by reading out the contents in the memory in a reverse order and applying an MAC generation function.

19. The method of claim 16, further comprising:
storing contents of the memory of the device, the random numbers, the memory filling map, and the remote check code generation expectation time.

20. The method of claim 16, further comprising:
generating the random numbers to fill out the free areas in the memory by use of a random function.

21. The method of claim 16, wherein the integrity confirmation determines the integrity check failure of the memory of the device if the remote check code generation time exceeds the remote check code generation expectation time according to a result of the determination.

22. The method of claim 16, wherein the remote check code generation expectation time is an average time taken to generate the remote check code if the integrity of the memory of the device is verified.

23. The method of claim 16, wherein the integrity of the memory is checked by comparing the local check code and the remote check code if a determination is made that remote check code generation time exceeds the remote check code generation expectation time but does not exceed a presorted threshold delay time.

24. The method of claim 16, wherein the integrity check parameters comprise the random numbers and the memory filling map which is used to fill the free areas in the memory with the random numbers.

25. A method for remotely verifying integrity of a memory by use of a system comprising a device and a verifier which is communicatively connected to the device via a network and remotely checks the integrity of a memory, the method comprising:

filling, by the verifier, free areas in a memory of the device with random numbers based on a presorted memory filling map and generating a local check code for the integrity check of the memory;

transmitting, by the verifier, integrity check parameters used by the device to generate a remote check code for the integrity check of the memory, to the device and measuring a transmission time of the integrity check parameters;

generating, by the device, the remote check code using the received integrity check parameters and transmitting the generated remote check code to the verifier;

detecting, by the verifier, a remote check code generation time by receiving the remote check code and measuring a reception time of the remote check code, and comparing the remote check generation time with a presorted remote check code generation expectation time; and confirming, by the verifier, the integrity of the memory of the device if the remote check code generation time does not exceed the remote check code generation expectation time according to a result of the comparison and the local check code matches the remote check code.

26. The method according to claim 25, wherein the local check code and the remote check code are generated using a message authentication code (MAC).

* * * * *